United States Patent [19]
Rascón Martínez et al.

[11] Patent Number: 6,084,783
[45] Date of Patent: Jul. 4, 2000

[54] METHOD AND DEVICE FOR CONTROLLING A POWER CONVERTER WITH AN AUXILIARY OUTPUT

[75] Inventors: Miguel Rascón Martínez, Jaen; Velasco Salvador Ollero; Enrique De La Cruz Moreno, both of Madrid, all of Spain

[73] Assignee: Alcatel, Paris, France

[21] Appl. No.: 09/186,644

[22] Filed: Nov. 6, 1998

[30] Foreign Application Priority Data

Nov. 7, 1997 [ES] Spain ................................ 9702338

[51] Int. Cl.⁷ ........................................ H02M 3/335
[52] U.S. Cl. .................... 363/21; 363/97; 363/56
[58] Field of Search ....................... 363/21, 97, 56, 363/131; 307/11

[56] References Cited

U.S. PATENT DOCUMENTS 4,063,307 12/1977 Stephens ............................. 363/21
4,704,670 11/1987 Gradl et al. ......................... 363/21

Primary Examiner—Shawn Riley
Attorney, Agent, or Firm—Sughrue, Mion, Zinn, Macpeak & Seas, PLLC

[57] ABSTRACT

Method for controlling the voltage at the main output of a low power switched power converter in which is generated a first signal (14), representative of the voltage at an auxiliary output which is an image of the main output voltage; it is combined with a second signal (16), representative of an input current to the converter, for generating a first control signal which together with a first reference signal are applied to a first controller means, generating a second control signal. The second control signal together with a second signal coming from an oscillator means are applied to a comparator, generating a switching signal (17) for opening and closing the switching element (6), and consequently the voltage at the main output is regulated.

6 Claims, 3 Drawing Sheets

METHOD AND DEVICE FOR CONTROLLING A POWER CONVERTER WITH AN AUXILIARY OUTPUT

OBJECT OF THE INVENTION

The present invention refers to a switched power converter and, more specifically, to a switched power converter to convert an input voltage into a DC output voltage different from the input voltage, and to a method for regulating said DC output voltage of said switched converter.

STATE OF THE ART

Topologies with isolation, such as a forward converter, include on a primary side a switching element for regulating a voltage at a main output on a secondary side. To regulate said output voltage, it is measured and this value is transmitted to the primary side where a control loop is located, without violating the isolation. This measurement is used for regulating the main output voltage.

Nevertheless, due to other design requirements on the secondary side, the control loop requires the use of several components, for example optocouplers, voltage regulators and/or an isolation transformer for transferring main output signals from the secondary side to the primary side of said forward converter, etc.

An example of this type of topology is a forward converter with regulated output voltage, known from FIG. 1, page C2-2, of the article "ISOLATING THE CONTROL LOOP" by Bob Mammano, Unitrode Switching Power Supply Design Seminar Manual, 1991 Issue, pages C2-1 to C2-15; hereby incorporated in this patent application by reference.

Nevertheless, for low power and/or low voltage switched power converter applications, the use of control loops built with said components, severely penalize said power converter in size and cost.

In other cases, like that of very low output voltage converters, for example<3.3 V, the implementation of said control circuitry on the secondary side, or else that dedicated to overvoltage or short-circuit protection at the output, has a high economic impact and, in addition, is difficult to apply. This is because the value of the output voltage is not sufficiently high to drive, for example, some switching elements located on the secondary side or other circuits (optocouplers), making it necessary to employ auxiliary outputs.

As a result, the use of these components in the control loop for performing the regulation of the main output voltage of said power converter, represents a major drawback in low output power and/or voltage applications.

CHARACTERIZATION OF THE INVENTION

An object of this invention is to perform the regulation of the voltage at a main output of a low output power and/or voltage switched power converter, maintaining the isolation between the primary side and the secondary side of said power converter.

Another object is to obtain the regulated voltage at the main output of said switched power converter in a simple manner and at a reduced cost. In other words, the influence of the regulating means in the size and cost of the power converter has to be small.

These and other objects are accomplished by applying a method of controlling the voltage at a main output of a low power switched power converter in which is generated a first signal, representative of the voltage at an auxiliary output of said power converter, this first signal being a sample of the main output voltage; being combined with a second signal, representative of an input current to said power converter, for generating a first control signal, which is applied to an input terminal of a first controller means. A first reference signal is applied to another input terminal of said first controller means, generating a second control signal.

The second control signal together with a second signal coming from an oscillator means, are applied to a comparator which generates a switching signal to control the time that a switching element is to be found open or closed, and consequently the main output voltage is regulated.

The value of the first signal is taken at an auxiliary output, not isolated, of the switched power converter. Consequently, the voltage of the main output is regulated in an indirect fashion by means of the first signal taken at the auxiliary output and of the second signal representative of the input current to the power converter.

By applying the control method the isolation of the power converter at the main output is maintained and the need to use components like for example optocouplers, current transformer, etc. is avoided. As a result the size and cost of the low output power switched power converter are reduced.

BRIEF DESCRIPTION OF THE FIGURES

A more detailed explanation of the invention is provided in the following description, based on the figures attached, in which.

DESCRIPTION OF THE INVENTION

Figure 1:
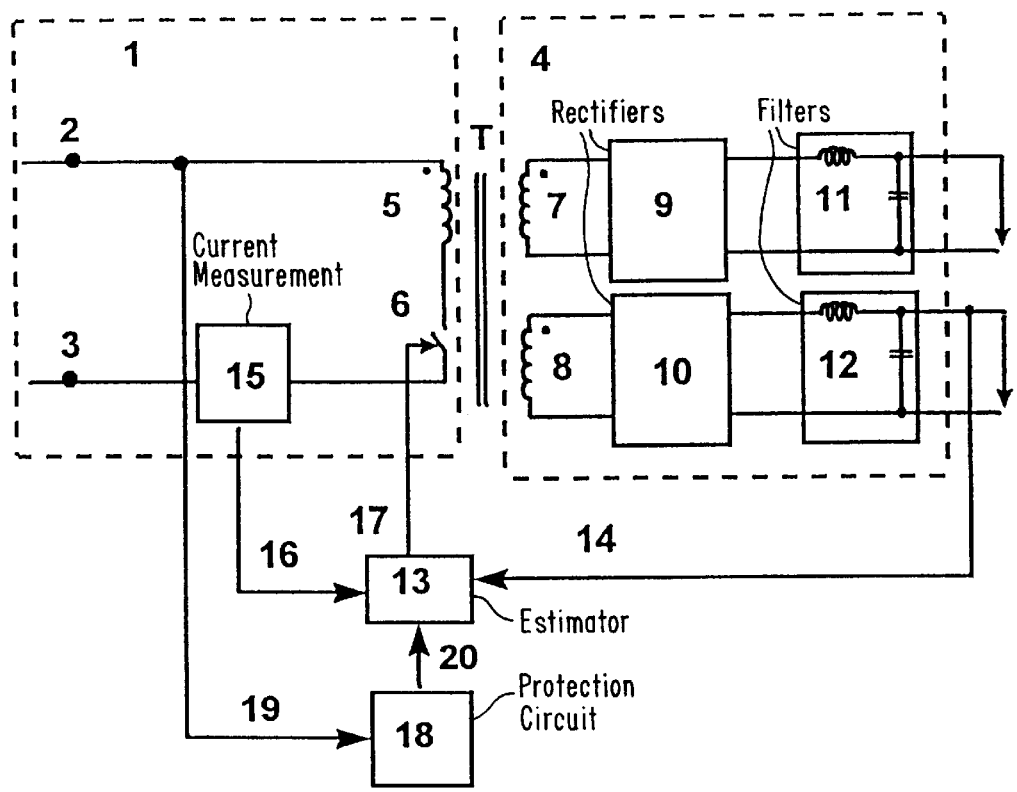
FIG. 1 shows a block diagram of a low power switched power converter including a regulating means for carrying out the method of control according to the invention.

FIG. 1 is a block diagram of a low power switched power converter with isolation, for example a forward converter, including a regulating means 13 to implement the method of the present invention. In order to make the description, a forward converter shall be used by way of example. Nevertheless, it is possible to use other topologies with isolation, such as a flyback converter.

The power converter comprises a transformer T to separate a high voltage side, primary side 1, from a lower voltage side, secondary side 4. The transformer T comprises at least a first winding 5, a second winding 7 and a third winding 8.

The primary side 1 is connected to a power distribution line via an input wire pair 2, 3, and includes the primary winding 5 in such a way that one of its ends is connected to conductor 2 and the other end of said primary winding is connected in series with a switching element 6, which is, in turn, connected to a measurement means 15 for measuring the current flowing in the primary side 1.

The measurement means 15 can also be located in other parts of the power converter, performing in the same manner the measurement of the current flowing in the primary side 1. In summary, the current is measured in an indirect manner.

The secondary side 4 of the forward converter comprises the second winding 7 which forms a main output of the forward converter, an isolated output for example. The second winding 7 is connected to a load through a rectifier means 9 and a filter 11.

It also comprises the third winding 8, forming an auxiliary output that can be connected to another load, in the event that the power converter has to supply an auxiliary voltage. In this case, the auxiliary output shall incorporate a rectifier means 10 and a filter 12. Nevertheless, the main function of the auxiliary output is to provide a sample or image of the voltage at the main output.

The power converter regulates the main output voltage by means of a regulating means 13. The regulating means 13 receive a first signal 14, representative of the DC voltage at the auxiliary output of the power converter, and a second signal 16, representative of an input current to said power converter.

The value of the first signal 14 is an image of the main output voltage. For example, for obtaining said image, both the second winding 7 and the third winding 8 are printed on a printed circuit board, achieving a very precise coupling; in this way the value of the auxiliary output voltage represents the value of the main output voltage exactly.

These signals 14, 16 are employed by the regulating means for regulating the main output voltage by means of a switching signal 17 for opening and closing the switching element 6.

Figure 2:
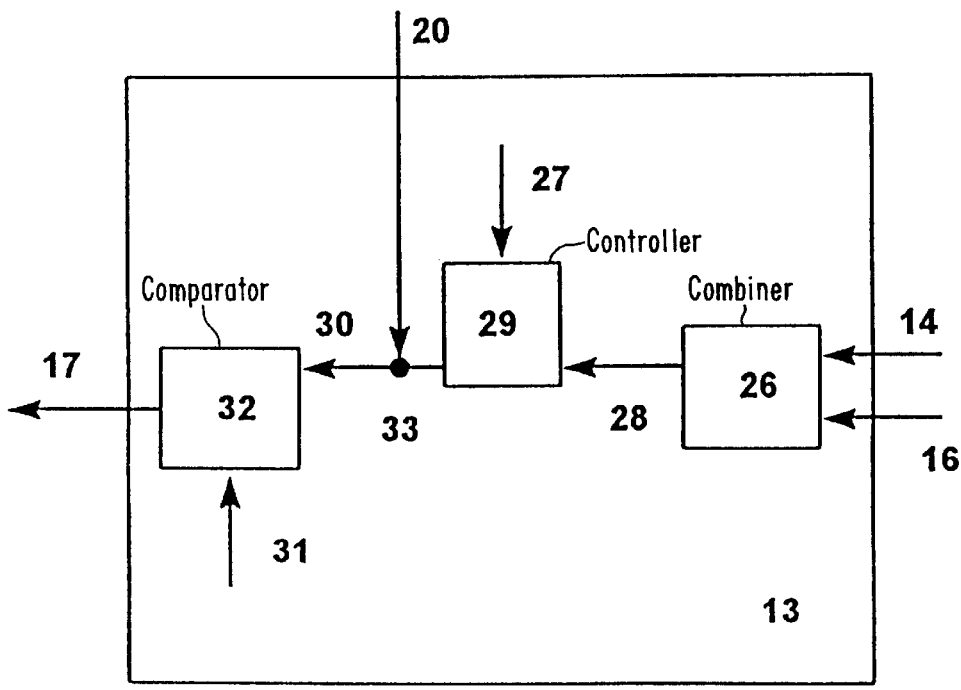
FIG. 2 shows a block diagram of a preferred implementation of the regulating means according to the invention.

FIG. 2 shows an implementation of the regulating means 13, it being possible to implement it in other forms for applying the method of the invention. The regulating means 13 comprise a combining means 26 for generating a first control signal 28, this being applied together with a first reference signal 27 to an input terminal pair of a first controller means 29, generating a second control signal 30 to control the duty cycle of the switching element 6.

The second control signal 30 and a second signal 31 produced by an oscillator means or sawtooth generator (not shown in FIG. 2) are applied to a comparator 32, which generates the switching signal for opening and closing the switching element 6, the main output voltage being regulated with this signal.

The value of the first signal 14 is taken from the auxiliary output, not isolated, of the switched power converter, being applied proportionally to the regulating means 13 on the primary side 1 of said converter, without use of optocouplers, voltage regulators, etc. Consequently, the third winding 8 is not isolated from the primary side 1 of the power converter. As a result, the circuitry for forming the regulating means 13 is very straightforward and economical, neither penalising the size nor the overall cost of the low power switched power converter.

A variation in the main output load and in the input current to the primary side 1 of the power converter implies a variation in the auxiliary output voltage and, consequently, the regulating means 13 use these variations to modify the duty cycle of the switching element 6 and thereby the main output voltage is brought back to its nominal value. Thus, the control of the duty cycle is a function of the auxiliary output voltage and of the current in the primary side 1.

In this way the main output voltage is maintained exactly with the required duty cycle to produce the DC voltage demanded by its load. As a result of the main output voltage regulation, the auxiliary output also has its voltage regulated, but in a less precise manner, though this output could be connected to a load that does not need a precisely regulated voltage.

The switched power converter comprises a protection means 18 to protect it in the event of extreme operating conditions, for example an overvoltage, avoiding the destruction of the power converter and of the loads to which it is supplying power.

Figure 3:
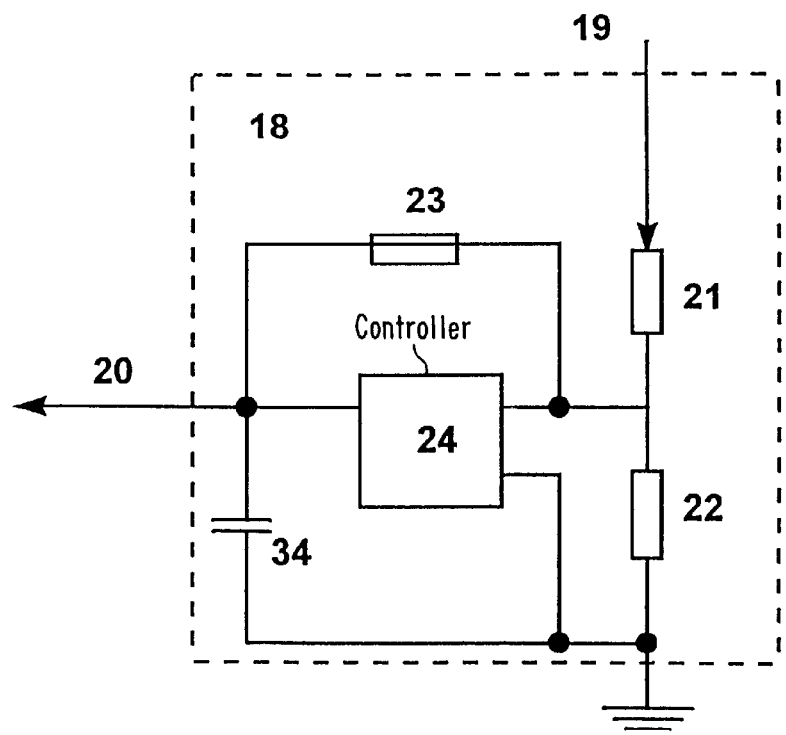
FIG. 3 shows a block diagram of a preferred implementation of a overvoltage protection means according to the invention.

FIG. 3 shows a possible configuration of the protection means 18, which prevent the operating limits of the power converter circuitry and its loads from being exceeded. For this, the protection means 18 establishes a range within which the duty cycle of the switching element 6 shall move under any abnormal operating condition of the power converter.

The protection means 18 receive a third signal 19, representative of the power converter input voltage, and generate a third control signal 20 which is applied to a node 33, in the conduction path of the second control signal 30. Thus, when the operating conditions of the power converter are abnormal, the comparator 32 uses this second signal 30 for generating the switching signal 17 for the switching element 6.

The protection means 18 comprise a second controller means 24 connected to a resistive network, for example. The resistive network includes a first resistor 21 connected to the conduction path of the third signal 19. The other end of the first resistor 21 is connected to an input terminal of the second controller means 24 and to an end of a second resistor 22, its other end being, in turn, connected to earth. A third resistor 23 is connected between said input terminal of the second controller means 24 and its output terminal. Between the output terminal and earth, an energy storage means 34 are connected.

One of the input terminals of said second controller means 24, is also referred to earth, for example.

When an abnormal operating condition occurs, the main output voltage rises for any type of circuit failure, for example. The second control signal 30 reflects the new main output voltage value by changing the opening and closing times of the switching element 6.

The variation in the switching signal 17 between its maximum and minimum values determines the value of the output voltage. During abnormal operation, the third control signal 20 limits the value of the output voltage, preventing an excessive increase in the second control signal 30, by disabling the converter, for example.

Figure 4:
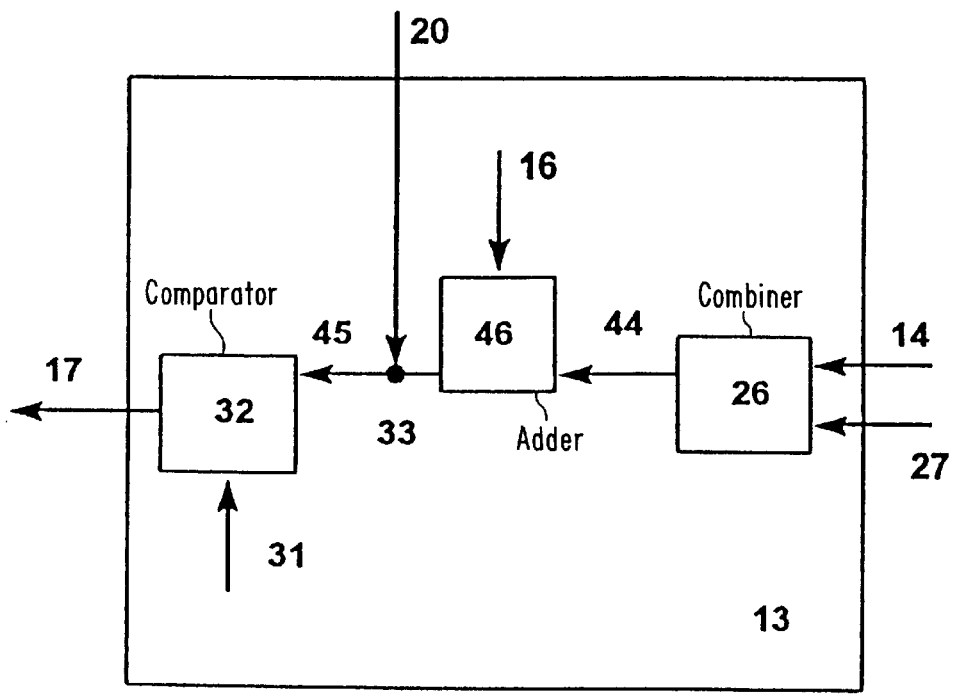
FIG. 4 shows a block diagram of another implementation of the regulating means according to the invention.
Figure 5:
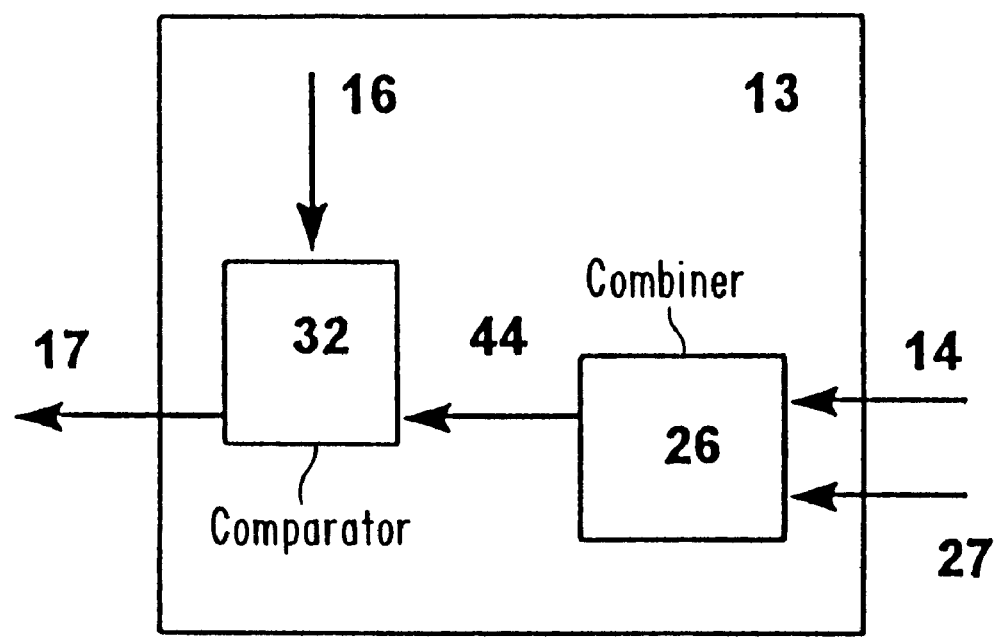
FIG. 5 shows a block diagram of another implementation of the regulating means according to the invention.

FIGS. 4 and 5 show other possible implementations of the regulating means 13. Thus, FIG. 4 shows that the first signal 14 and the first reference signal 27 are combined in the combining means 26, generating a fourth control signal 44.

This last signal 44 is added in an adder means 46 to the second signal 16, for generating a fifth control signal 45 which is compared with the second signal 31 in the comparator 32, for generating the switching signal 17.

FIG. 5 shows that the regulating means 13 for generating the switching signal 17 compare in the comparator 32 the fourth control signal 44 with the second signal 16.

We claim:

1. A method for controlling a low output voltage switched power converter having a main output providing an output voltage for driving a load, said method comprising the steps of: generating a first signal representative of the voltage at an auxiliary output of said power converter, said first signal being an image of the voltage at said main output and having a voltage higher than the voltage at said main output; generating a second signal representative of an input current to said power converter; estimating, by means of a regulation circuit, a switching signal for controlling the time that a switching element is in an open or closed state; and using the switching signal in such a way that the main output voltage of said power converter is regulated in response to said first signal and said second signal.

2. A method for controlling according to claim 1, characterized in that said estimating step comprises the steps of combining said first signal and said second signal for producing a first control signal; combining said first control signal with a first reference signal for generating a second control signal; and comparing said second control signal with a further signal (31) for producing the switching signal.

3. A method for controlling according to claim 2, characterized in that said estimating step further comprises the steps of combining said first signal with the first reference signal for generating a fourth control signal; adding said fourth control signal to said second signal for generating a fifth control signal; and comparing said fifth control signal with said further signal for generating the switching signal.

4. A method for controlling according to claim 3, characterized in that said estimating step further comprises the step of comparing said fourth control signal with said second signal for generating the switching signal.

5. A device for controlling a low output voltage switched power converter having a main output providing a main output voltage for driving a load, said device comprising a regulating circuit comprising a signal generator for generating a first signal representative of the voltage at an auxiliary output of said power converter and having a voltage higher than the voltage at said main output; a current measurement circuit for generating a second signal representative of an input current to said power converter; a combination circuit combining said first signal and said second signal for generating a first control signal, a first controller receiving said first control signal and the first reference signal for generating a second control signal; and a comparator comparing said second control signal with a further signal for generating a switching signal to open and close a switching element of said power calculator.

6. A device according to claim 5, characterized in that it additionally comprises a protection circuit which receives a third signal representative of an input voltage to said power converter and generates a third control signal to be applied to the comparator via a node located in a conduction path of the second control signal, for generating the switching signal (17) when the operating conditions of said power converter are abnormal.

* * * * *